US012748690B2

(12) United States Patent
Hegde et al.

(10) Patent No.: US 12,748,690 B2
(45) Date of Patent: Sep. 29, 2026

(54) METHOD FOR CONFIGURING MEMORY PLACEMENT IN A COMPUTING DEVICE

(71) Applicant: Harman International Industries, Incorporated, Stamford, CT (US)

(72) Inventors: Ravish Sreepada Hegde, Bangalore (IN); Hasnaa Rabbat, Novi, MI (US); Stuart Keough, Stamford, CT (US)

(73) Assignee: Harman International Industries, Incorporated, Stamford, CT (US)

( * ) Notice: Subject to any disclaimer, the term of this patent is extended or adjusted under 35 U.S.C. 154(b) by 39 days.

(21) Appl. No.: 18/852,848

(22) PCT Filed: Apr. 6, 2023

(86) PCT No.: PCT/US2023/065457
§ 371 (c)(1),
(2) Date: Sep. 30, 2024

(87) PCT Pub. No.: WO2023/196918
PCT Pub. Date: Oct. 12, 2023

(65) Prior Publication Data
US 2025/0238359 A1 Jul. 24, 2025

(30) Foreign Application Priority Data
Apr. 6, 2022 (IN) ............................ 202241020656

(51) Int. Cl.
*G06F 12/02* (2006.01)
*G06F 9/50* (2006.01)
*G06F 13/16* (2006.01)

(52) U.S. Cl.
CPC .......... *G06F 12/023* (2013.01); *G06F 9/5016* (2013.01); *G06F 13/161* (2013.01)

(58) Field of Classification Search
None
See application file for complete search history.

(56) References Cited

U.S. PATENT DOCUMENTS 7,577,813 B2 * 8/2009 Nijhawan ........... G06F 12/0806 711/170
7,584,465 B1 9/2009 Koh et al.
2002/0087652 A1 * 7/2002 Davis ...................... G06F 9/505 709/213

(Continued)

*Primary Examiner* — Kaushikkumar M Patel
(74) *Attorney, Agent, or Firm* — Angela M. Brunetti

(57) ABSTRACT

A system and method for allocating memory locations for a number of processing modules on a computing device having a predefined memory' layout, the method, is carried out by a processor for a. graphical user interface in communication with the computing device and includes the steps of receiving the predefined memory layout of the computing device at the graphical user interface, displaying the configuration of the predefined memory' layout of the computing device at the graphical user interface, receiving user input memory' placement requests for allocation of data to memory' locations, generating a configuration data, for the allocation of data to memory-'locations in the predefined memory layout of the computing device, and displaying, at the graphical user interface, a consumption guide showing estimated consumption levels for the allocation of data to memory locations as determined by the configuration data.

12 Claims, 6 Drawing Sheets

(56) References Cited

U.S. PATENT DOCUMENTS

| | | | | |
|---|---|---|---|---|
| 2004/0019891 | A1* | 1/2004 | Koenen ................. | G06F 9/5044 718/102 |
| 2007/0073993 | A1* | 3/2007 | Allen .................... | G06F 12/121 711/170 |
| 2012/0047435 | A1 | 2/2012 | Holladay et al. | |

* cited by examiner

600

Run Time Latency Level Per Component

604

Run Time Feedback on Latency Level

| | Audio Object | Block Id | Level1 | Level2 | Level3 | Level4 | Level5 | Level6 | Level7 | Level8 | Level9 |
|---|---|---|---|---|---|---|---|---|---|---|---|
| | Aa | = | Aa | Aa | Aa | Aa | Aa | Aa | Aa | Aa | Aa |
| ⊟ Win64 Total | | | 2,755 | 5,773 | 21,539 | 36,424 | 3,931 | 35 | 35 | 35 | 99 |
| ⊟ Entertainment Task Total | | | 2,755 | 5,773 | 21,539 | 36,424 | 3,931 | 35 | 35 | 35 | 99 |
| Framework Memory | | | 0 | 0 | 1,592 | 3,653 | 0 | 0 | 0 | 0 | 0 |
| ⊟ Ins0 Total | | | 2,755 | 5,773 | 19,947 | 32,771 | 3,931 | 35 | 35 | 35 | 99 |
| | Framework Memory | | 15 | 45 | 7999 | 3 | 3899 | 3 | 3 | 3 | 3 |
| | Control Math_1_0_0 | 18 | 0 | 0 | 0 | 0 | 0 | 0 | 0 | 0 | 0 |
| | Loudness3bandCompoundAO | 34 | 2448 | 0 | 0 | 0 | 0 | 0 | 0 | 0 | 0 |
| | Loudness3bandCompoundAO | 13 | 268 | 672 | 0 | 0 | 0 | 0 | 0 | 0 | 0 |
| | LUTBass_1_0_0 | 12 | 0 | 288 | 0 | 0 | 0 | 0 | 0 | 0 | 0 |
| | ToneControlExtended_1_0_0 | 11 | 0 | 628 | 0 | 0 | 0 | 0 | 0 | 0 | 0 |
| | ControlIn_1_0_0 | 10 | 0 | 15 | 0 | 0 | 0 | 0 | 0 | 0 | 0 |
| | Matrix Mixer_1_0_0 | 9 | 0 | 128 | 0 | 0 | 0 | 0 | 0 | 0 | 0 |
| | Router_1_0_0 | 8 | 0 | 64 | 0 | 0 | 0 | 0 | 0 | 0 | 0 |
| | Parameter Biquad_1_0_0 | 7 | 0 | 3872 | 8960 | 0 | 0 | 0 | 0 | 0 | 0 |
| | Limiter_1_0_0 | 6 | 0 | 0 | 2976 | 0 | 0 | 0 | 0 | 0 | 0 |
| | Volume and Mute_1_0_0 | 5 | 24 | 60 | 12 | 0 | 0 | 0 | 0 | 0 | 0 |
| | Delay_1_0_0 | 4 | 0 | 0 | 0 | 32768 | 32 | 32 | 32 | 32 | 0 |
| | Gain_1_0_0 | 3 | 0 | 0 | 0 | 0 | 0 | 0 | 0 | 0 | 96 |
| | AudioIO_2_0_0 | 2 | 0 | 0 | 0 | 0 | 0 | 0 | 0 | 0 | 0 |
| | AudioIO_1_0_0 | 1 | 0 | 0 | 0 | 0 | 0 | 0 | 0 | 0 | 0 |
| | LUTTreble_1_0_0 | 19 | 0 | 0 | 0 | 0 | 0 | 0 | 0 | 0 | 0 |

602

FIG. 6

METHOD FOR CONFIGURING MEMORY PLACEMENT IN A COMPUTING DEVICE

CROSS-REFERENCE

This application claims priority to provisional application 202241020656, filed Apr. 6, 2022, in India, the entirety of which are incorporated by reference herein.

TECHNICAL FIELD

The present disclosure relates to memory placement in a computing device and more particularly, to configuring computing device memory latency.

BACKGROUND

Computing devices, such as digital signal processors (DSP), are processors that run algorithms to mathematically manipulate digitized signals, such as, but not limited to, voice, audio, video, sonar, radar, etc. Signal processing is implemented using one or more processors, or microprocessors, that comprise one or more data memory systems. For example, internal memory, cached memory, external memory, among others.

Computing device performance is measured in many ways, but the most common metric is a time required for a processor to accomplish a task, which depends on placement of data in memory to achieve the fastest access time, thus decreasing processing time. Processors have multiple memory types. Lower level memory types, i.e., Level 1, are smaller in size with short access times making them "faster". Higher level memory types, i.e., Level 2-Level 16, are larger in size with longer access times making them "slower". A hierarchy from fastest to slowest is Level 1 (L1) as fastest and Level 16 (L16) as slowest. Different systems will have differing number of memory types. Memory latency correlates with a duration of time needed from initiating a request for accessing memory to reading and writing data at the requested memory.

Typically, placement of data in memory requires: 1) calculating how much memory a processing pipeline will require, 2) gaining an understanding of how each type of memory is used and how frequently it is used, 3) placing memory blocks in such a way that the fastest memory is allocated to a part of a process which would benefit the most from faster access, 4) compiling code after completing memory placement, and 5) flashing the files on flash-based memory storage devices.

To optimize processor performance, the code changes described above are iteratively performed. After each code change, the code is compiled and flashed before the effect on the processor can be measured. In practice, multiple code changes are required because there are multiple blocks competing for the lowest latency/fastest memory. A current disadvantage to this approach is that it is a tedious and time-consuming effort and does not offer much flexibility to an engineer. The approach is time complex, time consuming, and typically results in processing resources that are under-utilized.

SUMMARY

The inventive subject matter includes one or more embodiments of an interface system for configuring memory placement in a computing device having a plurality of processing modules, the plurality of processing modules each have data to be stored in a plurality of memory locations of the computing device to be accessed and communicated to a system for execution. The interface system comprises a communication protocol for receiving a memory layout from the computing device, a graphical user interface for displaying a configuration for each of the plurality of processing modules to a memory location within the memory layout, a memory placement request for a modification to the configuration, the memory placement request is entered by a user at the graphical user interface and correlates a processing module with a latency level for a memory location in the plurality of memory locations. And a configuration data generated at the graphical user interface, the configuration data represents placement of data to be stored in the plurality of memory locations based on the memory placement request for each processing module and a memory capacity of the computing device.

In one or more embodiments, the graphical user interface includes a plurality of options for the user to select the memory placement request, wherein one or more user selected placement requests are used to generate the configuration data.

In one or more embodiments, a consumption guide is displayed showing consumption levels for the configuration data.

In one or more embodiments an allocator on the computing device allocates a memory layout according to the configuration data.

In one or more embodiments, a results profile is displayed indicating the results of the configuration of the memory layout as modified according to the configuration data.

The inventive subject matter includes one or more embodiments of a method for allocating memory locations for a predetermined number of processing modules, the memory locations are on a computing device having a predefined memory layout. the processing modules have instructions to be stored in memory locations according to a configuration where they may be accessed and carried out by the computing device, the method is carried out by a processor for a graphical user interface in communication with the computing device. The method includes the steps of receiving the predefined memory layout of the computing device at the graphical user interface, displaying the configuration of the predefined memory layout of the computing device at the graphical user interface, receiving user input memory placement requests for allocation of data to memory locations, the user input memory placement requests are input at the graphical user interface, generating, in the processor for the graphical user interface, a configuration data for the allocation of data to memory locations in the predefined memory layout of the computing device, the configuration data is based on the user input memory placement requests for memory allocation and a memory capacity of the computing device, and displaying, at the graphical user interface, a consumption guide showing estimated consumption levels for the allocation of data to memory locations as determined by the configuration data.

In one or more embodiments, the method further comprises the steps of presenting a plurality of options for user selections of requests for memory allocations and generating the configuration data base don the user selections.

In one or more embodiments, the method further comprises sending the configuration data to the computing device where it is allocated to memory locations according to the configuration data.

In one or more embodiments, the method further comprises displaying, at the graphical user interface, a results profile, the results profile shows memory allocations made according to the configuration data.

In one or more embodiments, the method further comprises the step of prioritizing the user input memory placement requests based on estimated consumption levels and the results profile.

DESCRIPTION OF DRAWINGS

FIG. 6 is a screen shot of a results profile displayed at the GUI.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to FIGS. 1-5, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Figure 1:
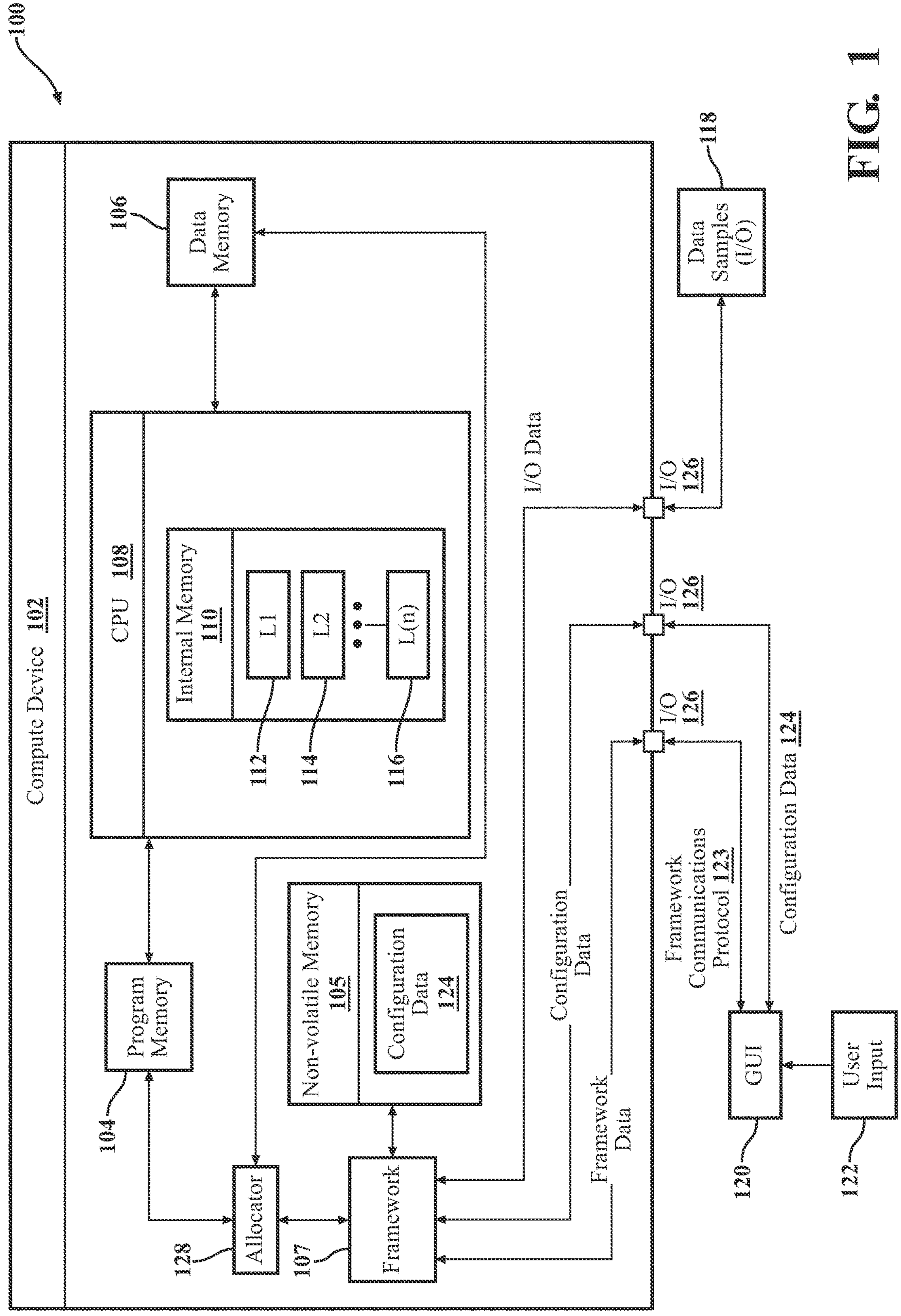
FIG. 1 is a block diagram of an example computing device.

FIG. 1 is a block diagram of a system 100 for configuring memory placement on a computing device 102. The computing device 102 has at least one processor, programming for executing instructions and computations, and memory for program and data storage. The computing device 102 has a program memory 104 that stores programs used by the computing device 102 to process data. A data memory 106 stores the information (data) to be processed. A compute engine 108 (CPU) accesses a program from the program memory 104 and the information from the data memory 106 for mathematical manipulation.

The CPU 108 has internal memory 110 that is divided into levels, L1 112, L2 114 to Ln 116, (where n depends on processor architecture), that are intended to be used in a manner that minimizes time for memory access. This is referred to as local memory, and as described above, the levels are differentiated by size and speed of access. Memory on the CPU 108 is typically accessed faster than external memory such as program memory 104 and data memory 106. Level L1 112 may be considered the fastest and level Ln 116 may be considered the slowest. Level L2 114 is slower than level L1 112 but faster than level Ln 116. Data is supplied to and from the computing device 102 by way of an Input/Output (I/O) block 118.

Each type of memory, program memory 104, data memory 106, and internal memory levels 112, 114, 116, each has its own fetch time. Depending on where data is placed, or configured, in a memory layout, the CPU 108 can fetch data faster and perform manipulations at a higher rate. In one or more embodiments, a graphical user interface (GUI) 120 receives user input 122 which indicates a configuration for memory placement to accommodate signal flow in the computing device 102. The GUI 120 provides a user with the ability to input modifications to memory placement. From the GUI 120 the user may select specific levels to which the programs and data will be placed in memory to test and preview the effect the selections will have on the computing device 102.

The GUI 120 generates configuration data 124, which is communicated to the computing device 102 via a general communications port 126 and reflects a modification to a configuration for the memory placement, as requested by the user, into a memory layout of the computing device. General communications port 126 is used for sending and receiving all configuration and feedback data between the GUI and the computing device 102. The configuration data 124, once generated, may be sent to the computing device 102 via a communication protocol 123, where it is stored by the computing device 102 into a persistent memory 105 of the program memory 104 and/or data memory 106. There is no need for hard-coding. Compiling and flashing are not needed and an allocator 128 in the computing device 102 configures memory placement according to the configuration data 124.

A framework 107 connects, by way of communication protocol 123, to the GUI 120, to provide information about the memory capacity of the computing device 102. The computing device memory capacity is presented to the user and used by the GUI when generating the configuration data 124. The GUI 120 presents the user with options for selections as user inputs 122. The selections are used to generate the configuration data 124. For example, an object, such as an audio module in a multi-channel audio system, has memory types and sizes. The user selects, by way of the GUI 120, the latency requested to be assigned to the module.

The configuration data 124 is generated at the GUI and communicated back to the computing device 102 where an allocator 128 will determine, based on the computing device memory capacity, whether the computing device may fulfill the requested assignments The allocator 128 will accommodate the configuration data 124 to the best of the computing device's memory capacity.

In the event the allocator 128 is not able to accommodate latency assignments as requested by the user and set out in the configuration data 124, default settings will be applied at the computing device 102. The allocator 128 will provide details on the allocations made and send profiling results to the GUI where it is displayed to the user as a results profile. The results profile shows the user how the configuration data allocated the data into memory locations and how it will affect the computing device's memory capacity and its processing performance. The profiling results and the configuration of the memory layout may be used to allocate memory having the fastest fetch time to the object considered, by the user, to be most critical.

Figure 2:
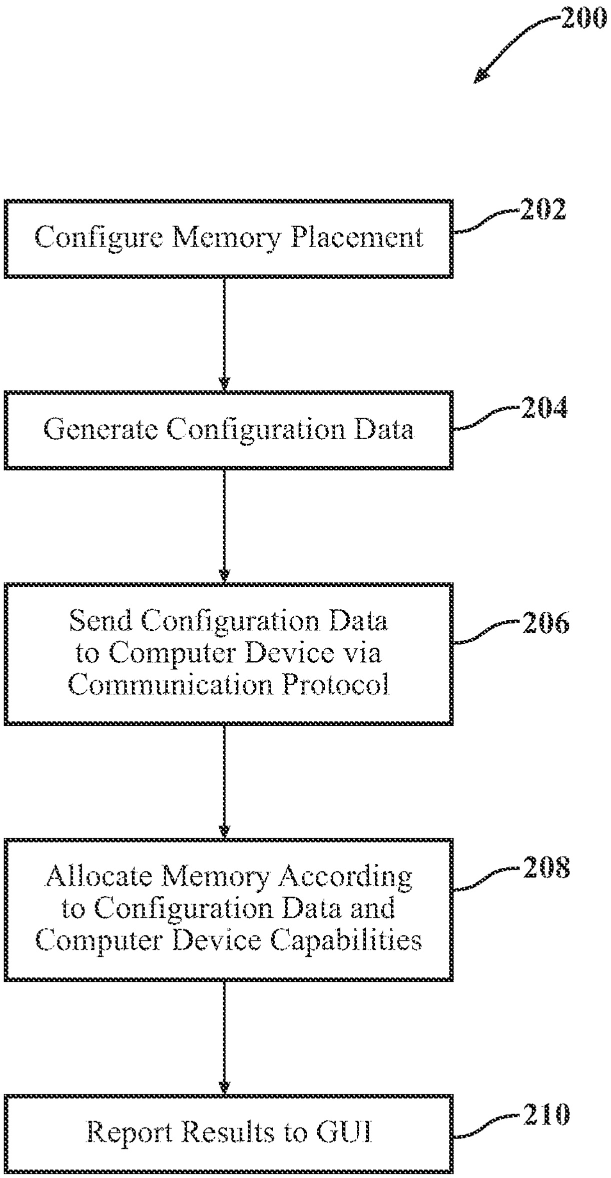
FIG. 2 is a flow chart of one or more embodiments of a method for configuring memory latency in the example computing device.

FIG. 2 is a flow chart of one or more embodiments for a method 200 to allocate memory for a placement of data stored in one or more memory locations of a memory layout on a computing device. The placement of data to be stored in memory on the computing device is configured 202 by the user at the GUI. To configure the memory placement, the user inputs one or more requests for memory placement of data by selecting a latency level for a memory block. The latency level for the memory block determines where an assignment of data should occur when the configuration data is generated at the GUI, communicated to the computing device, and implemented at the computing device.

A configuration data is generated 204 at the GUI and contains all such requests for memory placement that a user would like to be "tested" for an indication of how the memory placement requests affect a performance of the computing device. The configuration data is sent 206 to the computing device by way of the communication protocol where it is allocated 208 to the computing device memory by an allocator The allocator allocates the memory based on a memory capacity of the computing device. Whether or not the computing device may fulfill the requested assignments is reported 210 back to the GUI to be displayed to the user. The goal of the user is to optimize the performance of the computing device, so the user may assess the results to determine whether modifications to the memory placement need to be requested.

The configuration data is communicated to the computing device and tested without a need to compile and flash a code change prior to measuring its effect on the computing device. This scenario allows a user, through the GUI and its connection to the computing device, the flexibility to test the computing device performance for optimizing performance efficiently and quickly through memory placement without the need for time consuming hard-coded memory placement.

Figure 3:
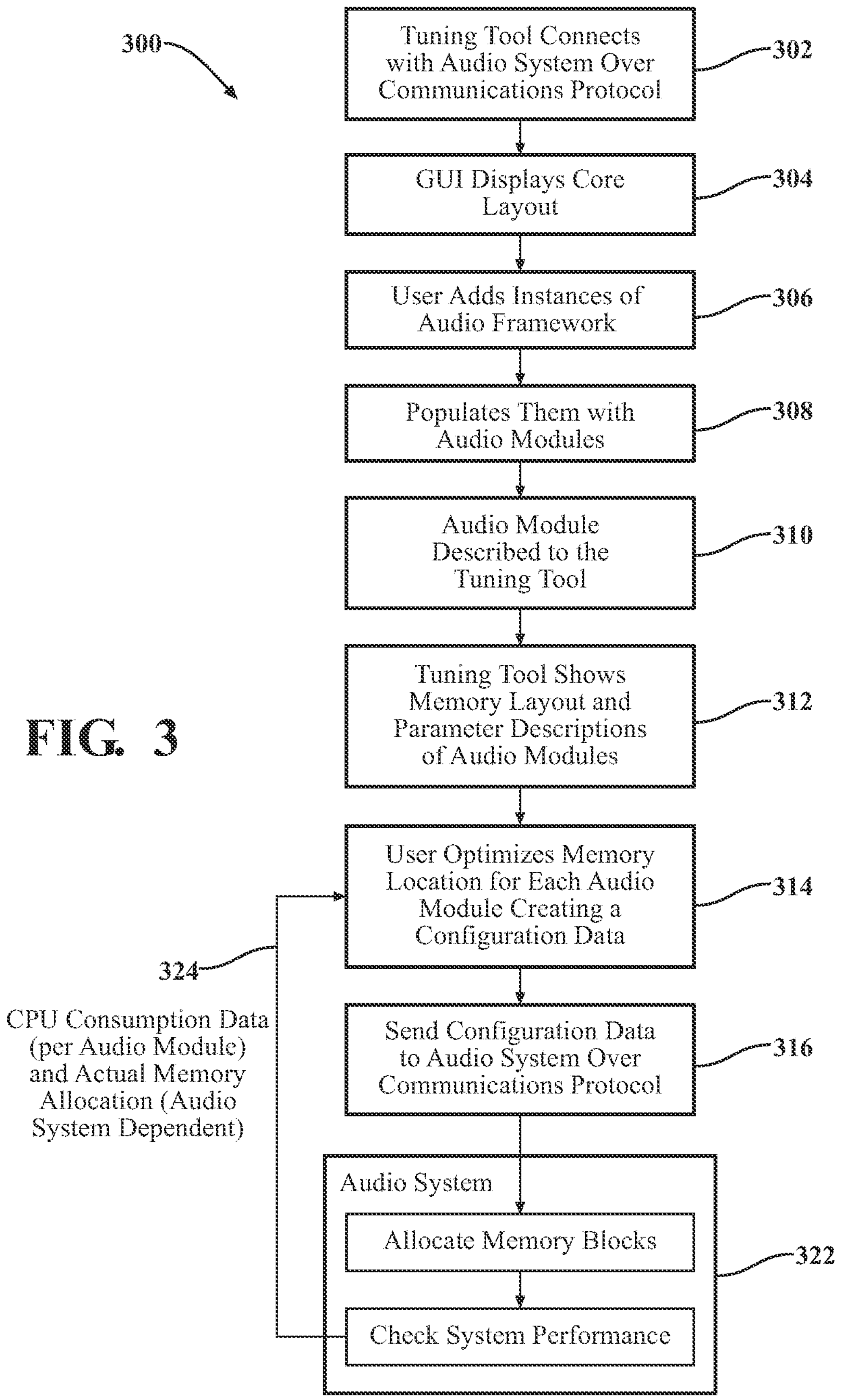
FIG. 3 is an example flow chart of the method for configuring memory latency in an audio system.

As an example, the system and method are described as a tuning tool for an audio system. FIG. 3 is a flow chart of one or more embodiments of a method 300 to configure memory placement of data in a computing device of the audio system. The audio system has a framework that is populated with audio modules. Each audio module contains a distinct piece of audio processing logic to instruct an amplifier in the audio system to perform a function. In the example described hereinafter, the computing device may be a digital signal processor (DSP) in the audio system. However, it should be noted that the DSP is described only for example purposes and the inventive subject matter may be applied to other types of computing devices and other types of systems that benefit from memory allocation to enhance performance capabilities. The terms computing device and DSP may be used interchangeably throughout the description hereinafter.

According to the method 300, the tuning tool connects 302 with the audio system over a communication protocol and, upon connection, the audio system sends a layout of its cores and memory configuration to the graphical user interface (GUI). The GUI displays 304 the configuration and the existing layout of cores in the computing device of the audio system. The audio system has a signal flow associated therewith which becomes viewable at the GUI.

Figure 4:
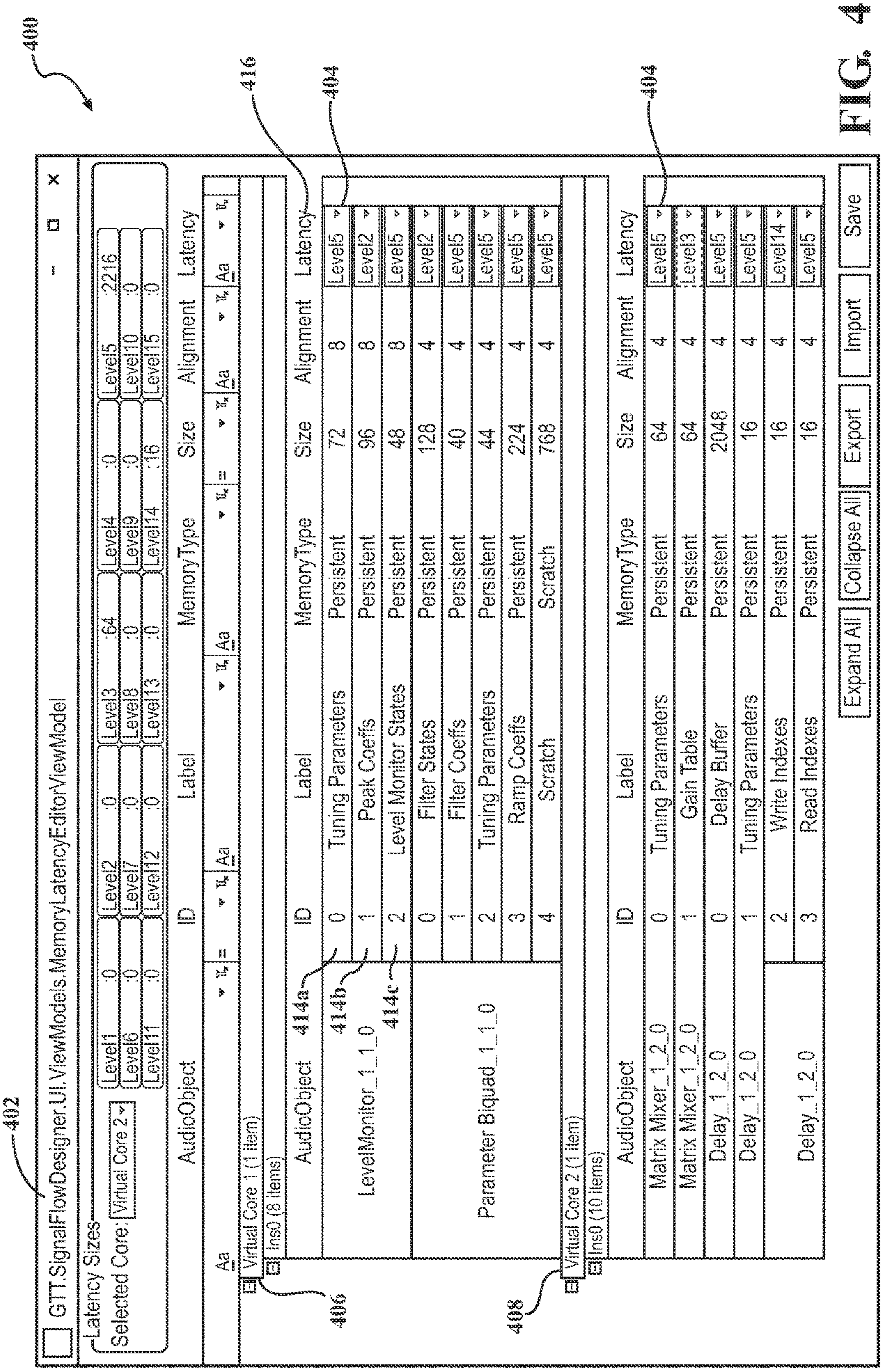
FIG. 4 is a screen shot of a layout view displayed at a graphical user interface (GUI)

FIG. 4 is a screenshot of the GUI showing the signal flow as a layout view 400 where the user can view an overview of the configuration of the memory layout and signal flow 402 for the connected audio system. The layout view is also where the user inputs memory placement requests 404. In the screenshot in FIG. 4 only a portion of the memory configuration of the audio system is visible. In the present example, a first core 406 and a second core 408 of the memory configuration are shown.

Referring to the method 300 shown in FIG. 3, the user enters, or adds, 306 instances of audio framework (that may be, for example, data or programming instructions) and populates 308 the instances with audio modules according to the user's request for memory placement, based on, for example, memory latency. The user's request for memory placement is entered by selecting, from a drop-down menu, their requests at each memory block. This is shown by example in FIG. 4. The first core 402 has a first audio module 406 and a second audio module 408. The first audio module has three memory blocks 414*a*, 414*b*, and 414*c*. Each audio module may have multiple memory blocks, and each memory block may have a configurable memory latency. The memory latency 416 is selected, by the user, at the drop-down menu. Each memory block 414*a*, 414*b*, 414*c* defines an area of memory which requires allocation for the audio module 406.

Referring again to FIG. 3, the user describes 310 each audio module to the tuning tool and the tuning tool displays 312 a memory layout with parameter descriptions, for example, an ID number, a label, a memory type, a file size, etc. The user also inputs 314 their requests for memory placement for each memory block in an audio module to generate a configuration data. For example, in FIG. 4, the GUI displays the overview of the signal flows 402 for current memory placement configuration and the user can decide what modification to the memory latency level 416 to make for a memory block 414*c*. In this step the user is combining knowledge of current resource consumption with performance metrics displayed at the GUI to make modifications to the latencies of memory blocks in such a manner that the system may be optimized, for example, to operate as fast as possible.

Referring back to FIG. 3, once generated the configuration data is sent 316 to the audio system over the communication protocol, thereby creating a change to an allocation strategy without having to modify code and/or reflash the audio system.

Figure 5:
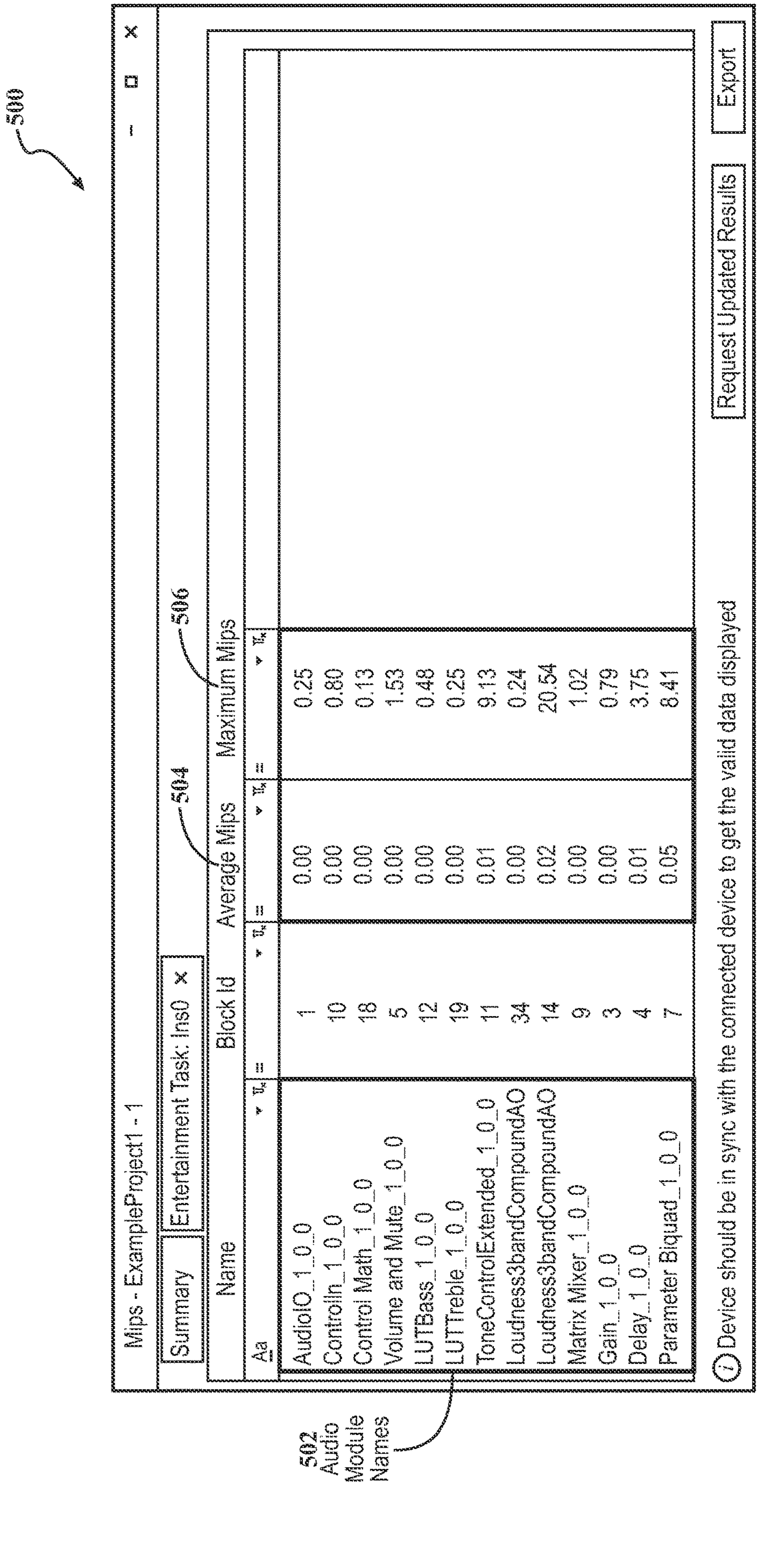
FIG. 5 is a screen shot of a consumption level displayed at the GUI.

Performance metrics of a consumption guide 500 is displayed at the GUI as shown in FIG. 5. Each audio module 502 is shown with its consumption levels in the form of an average MIPS 504 and a maximum MIPS 506. The information presented in the consumption guide 500 provides the user with valuable feedback and information about resource consumption of the DSP as memory placement requests are sent to the computing device by the user.

An allocator on the computing device of the audio system allocates 322 memory placements in accordance with the configuration data and the memory capacity of the DSP and system performance is checked at the computing device. The results are presented at the GUI as a results profile of CPU consumption data (per audio module) and actual memory allocation (which is audio system dependent). The memory placement allocated by the allocator is then visible 324 on the GUI where the user can see a visual representation of the individual memory blocks and their latency.

FIG. 6 is a screenshot of an example of the results profile 600. The results profile 600 includes a list of the audio modules 602 along with a memory block ID 604 for each audio module. The information presented in the results profile 600 provides the user with valuable feedback and information about performance metrics of the DSP once the configuration data generated by the GUI is allocated to the DSP, thereby allowing the user to make modifications to the latencies of memory blocks in such a manner that optimizes the system performance.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. For example, the latencies of multiple memory blocks may be modified at the same time in an Excel file and imported to the tuning tool at the GUI.

According to the inventive subject matter, memory placement is no longer hardcoded, and DSP engineers can easily and quickly improve MIPS utilization. Instead of modifying code, re-compiling, and re-flashing to modify memory placement, the user may simply modify the memory placement by inputting selections at the GUI to generate a configuration file. The configuration file is sent to the DSP via xTP, resulting in a much more flexible and faster method to optimize processor performance and memory placement.

Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms “comprise”, “comprises”, “comprising”, “having”, “including”, “includes” or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

The invention claimed is:

1. A computing system having a plurality of processors and a plurality of memory locations storing instructions that, when executed by one or more processors in the plurality of processors, cause the computing system to:

receive, from the plurality of processing modules executing on the computing system, a memory layout including memory access characteristics including latency level and data size associated with data generated by each processing module in the plurality of processing modules;

render, via a graphical user interface, a visual representation of a configuration for each of the plurality of processing modules to selected memory locations within the memory layout;

receive, via the graphical user interface, a user input specifying a modification to the memory placement of one or more processing modules to the selected memory location within the memory layout;

in response to the user input, dynamically modify the memory layout by reallocating at least a portion of the data generated by the one or more processing modules to a different memory location by correlating the user input with the latency level for a memory location and data size; and control operation of the computing system by causing the reallocated data to be stored in the different memory locations according to the modified memory layout.

2. The computing system of claim 1, wherein receiving the user input, via the graphical user interface, further comprises user input selected from a plurality of options for the user to specify a modification to the memory placement wherein one or more memory placement requests are used to generate the reallocation to different memory locations.

3. The computing system of claim 2, further comprising:

generate, based on user input, an estimate of consumption levels of memory capacity at different memory locations; and render, via the graphical user interface, a visual representation of consumption levels for one or more user selected memory placement requests.

4. The computing system of claim 3, wherein the consumption levels are presented, via the graphical user interface, to show a memory location having the fastest fetch time of all the memory locations.

5. A method for allocating memory locations for a predetermined number of processing modules, the memory locations are on a computing device having a predefined memory layout, the processing modules have instructions to be stored in memory locations according to a configuration where they may be accessed and carried out by the computing device, the method is carried out by a processor for a graphical user interface in communication with the computing device, the method comprising the steps of:

receiving the predefined memory layout of the computing device at the graphical user interface;

displaying the configuration of the predefined memory layout of the computing device at the graphical user interface;

receiving user input memory placement requests for allocation of data to memory locations, the user input memory placement requests are input at the graphical user interface;

generating, in the processor for the graphical user interface, a configuration data for the allocation of data to memory locations in the predefined memory layout of the computing device, the configuration data is based on the user input memory placement requests for memory allocation and a memory latency level of the computing device; and displaying, at the graphical user interface, a consumption guide showing estimated consumption levels for the allocation of data to memory locations as determined by the configuration data.

6. The method as claimed in claim 5, further comprising the steps of:

presenting, at the graphical user interface, a plurality of options for user selections of user input requests for memory allocations; and generating the configuration data based on one or more user selections.

7. The method as claimed in claim 5, further comprising the steps of:

sending the configuration data to the computing device; and allocating the data to memory locations in the predefined memory layout according to the configuration data.

8. The method as claimed in claim 6, further comprising the step of displaying, at the graphical user interface, a results profile of the allocation of data to memory locations according to the configuration data, the results are sent to the graphical user interface as a layout of the data in each of the memory locations in the predefined memory layout.

9. The method as claimed in claim 5, further comprising the step of prioritizing the user input memory placement requests based on the estimated consumption levels and the results profile.

10. A computing system having a digital signal processor (DSP), a plurality of audio modules executable by the DSP, a plurality of memory locations associated with the DSP, and one or more processors configured to execute instructions that cause the computing system to:

establish communication with the audio system to obtain information identifying the plurality of audio modules, memory usage characteristics of each audio module, and latency and capacity characteristics of the plurality of memory locations;

generate, based on the memory usage characteristics and the latency and capacity characteristics, a memory allocation for placing executable code and data of the plurality of audio modules into selected memory locations of the DSP;

render, via a graphical user interface, a visual representation of the memory allocation including associations between each of the plurality of audio modules and corresponding memory locations;

receive, via the graphical user interface, a user input specifying a modification to the memory allocation the memory modification includes a constraint associated with at least one of latency, bandwidth, or memory capacity;

in response to the user input, dynamically update the memory allocation by reallocating at least one audio module to a different memory location that satisfies the constraint;

transmit the updated memory allocation to the DSP; and cause the DSP to reconfigure execution of the plurality of audio modules in different memory locations and executing the at least one reallocated audio module from the different memory location.

11. The computing system of claim 10, wherein receiving the user input, via the graphical user interface further comprises user input from a plurality of options for user selection.

12. The computing system of claim 11, further comprising:

generate, based on user input, an estimate of consumption levels of memory capacity at different memory locations; and render, via the graphical user interface, a visual representation of consumption levels.

* * * * *